United States Patent
Hashimoto

(10) Patent No.: US 12,030,495 B2
(45) Date of Patent: Jul. 9, 2024

(54) TRAVEL ASSIST DEVICE FOR VEHICLE

(71) Applicant: ADVICS CO., LTD., Kariya (JP)

(72) Inventor: Yosuke Hashimoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 304 days.

(21) Appl. No.: 17/435,821

(22) PCT Filed: Mar. 16, 2020

(86) PCT No.: PCT/JP2020/011439
§ 371 (c)(1),
(2) Date: Sep. 2, 2021

(87) PCT Pub. No.: WO2020/196022
PCT Pub. Date: Oct. 1, 2020

(65) Prior Publication Data
US 2022/0153270 A1    May 19, 2022

(30) Foreign Application Priority Data
Mar. 25, 2019  (JP) ................................ 2019-056648

(51) Int. Cl.
*B60W 30/18*  (2012.01)
*B60W 30/14*  (2006.01)
*B60W 40/105*  (2012.01)

(52) U.S. Cl.
CPC .... *B60W 30/18109* (2013.01); *B60W 30/143* (2013.01); *B60W 40/105* (2013.01);
(Continued)

(58) Field of Classification Search
CPC ..... B60W 2720/103; B60W 30/18018; B60W 40/00; B60W 40/02; B60W 40/04;
(Continued)

(56) References Cited

U.S. PATENT DOCUMENTS

| 9,540,005 B1 * | 1/2017 | Howe-Veenstra ..... G01C 21/20 |
| 2015/0367845 A1 | 12/2015 | Sannodo et al. |

(Continued)

FOREIGN PATENT DOCUMENTS

| CN | 106996793 A | 8/2017 |
| JP | H11227494 A | 8/1999 |

(Continued)

OTHER PUBLICATIONS

Translation of KR-2017013982-A.*
(Continued)

*Primary Examiner* — Russell Frejd
*Assistant Examiner* — Sara J Lewandroski
(74) *Attorney, Agent, or Firm* — BUCHANAN INGERSOLL & ROONEY PC

(57) ABSTRACT

A travel assist device includes: a creation unit configured to create a traveling profile based on a total traveling distance; and an output unit configured to output an operation amount according to a target state amount, which is a target value of a state amount indicated by the traveling profile, to at least one of a driving device and a braking device. In a state in which a vehicle travels by the driving of at least one of the above devices based on the operation amount, the creation unit re-creates a traveling profile so that the acceleration of the vehicle does not exceed a predetermined limit value if the difference between an actual value of the state amount and the target state amount is equal to or larger than a judgment difference.

14 Claims, 5 Drawing Sheets

(52) U.S. Cl.
CPC ..... *B60K 2310/244* (2013.01); *B60T 2201/02* (2013.01); *B60W 2720/103* (2013.01)

(58) Field of Classification Search
CPC .. B60W 40/06; B60W 40/064; B60W 40/068; B60W 40/072; B60W 40/076; B60W 40/08; B60W 40/09; B60W 40/10; B60W 40/105; B60W 40/107; B60W 30/14; B60W 30/143; B60W 30/146; B60W 30/16; B60W 30/162; B60K 2310/00; B60K 2310/24; B60K 2310/244; B60K 2310/30; B60T 2201/02; B60Y 2300/14; B60Y 2300/143; B60Y 2300/146
See application file for complete search history.

(56) References Cited

U.S. PATENT DOCUMENTS

2017/0122749 A1   5/2017   Urano et al.
2019/0217724 A1*  7/2019   Erb ......................... B60K 6/48

FOREIGN PATENT DOCUMENTS

| JP | 2006327545 A | * | 12/2006 | |
| JP | 2006327545 A | | 12/2006 | |
| JP | 2007186096 A | | 7/2007 | |
| JP | 2008120302 A | | 5/2008 | |
| JP | 2009070101 A | | 4/2009 | |
| JP | 2016002957 A | | 1/2016 | |
| KR | 2017013982 A | * | 12/2017 | .............. B60W 3/14 |

OTHER PUBLICATIONS

Translation of JP-2006327545-A.*
International Search Report (PCT/ISA/210) with translation and Written Opinion (PCT/ISA/237) mailed on Jun. 16, 2020, by the Japanese Patent Office as the International Searching Authority for International Application No. PCT/JP2020/011439.

* cited by examiner

TRAVEL ASSIST DEVICE FOR VEHICLE

TECHNICAL FIELD

The present disclosure relates to a travel assist device for a vehicle that assists in traveling of a vehicle to a target position.

BACKGROUND ART

PTL1 describes an example of a travel assist device for causing a vehicle to travel according to a traveling route from a parked traveling start position to a target parking position. In this travel assist device, at the time of causing the vehicle to travel according to the traveling route, multiple velocity patterns having different vehicle velocity target values are generated. Then, based on information on an object that is present near the vehicle, one velocity pattern is selected out of the velocity patterns as a target velocity pattern, and traveling of the vehicle is controlled based on the target velocity pattern.

CITATION LIST

Patent Literature

PTL 1: JP-A-2016-2957

SUMMARY

Technical Problem

When the traveling of the vehicle is controlled after selecting a first velocity pattern out of the generated velocity patterns as the target velocity pattern, if the above information changes, the target velocity pattern may be changed to a second velocity pattern. If the target velocity pattern is changed in this manner, the vehicle velocity target value is changed. In this event, if the vehicle velocity target value of the second velocity pattern is larger than the vehicle velocity target value of the first velocity pattern and these target values differ largely, the vehicle might be accelerated rapidly with the change of the target velocity pattern, which makes an occupant of the vehicle feel a sense of discomfort.

Solution to Problem

A travel assist device for a vehicle for solving the above problem is a device that assists in traveling of a vehicle from a start position to a target position. This travel assist device includes: a creation unit configured to create a traveling profile, which is an index of a change in a state amount on a vehicle velocity of the vehicle with respect to the lapse of time, based on a traveling distance of the vehicle from the start position to the target position; and an output unit configured to output an operation amount according to a target state amount, which is a target value of the state amount indicated by the traveling profile, to at least one of a driving device and a braking device of the vehicle. In a state in which the vehicle travels by driving of the at least one of the devices based on the operation amount, the creation unit re-creates the traveling profile so that acceleration of the vehicle does not exceed a predetermined limit value if a difference between an actual value of the state amount and the target state amount is equal to or larger than a judgment difference.

According to the above configuration, when the traveling profile is created, the operation amount according to the target state amount, which is the target state amount indicated by the traveling profile, is output to at least one of the driving device and the braking device. Thus, the vehicle travels automatically by the driving of the at least one of the devices based on the operation amount. In other words, the vehicle travels automatically according to the traveling profile. When the vehicle travels automatically according to the traveling profile, the traveling profile is re-created so that the acceleration of the vehicle does not exceed the predetermined limit value if the difference between the actual value of the state amount and the target state amount is equal to or larger than the judgment difference. After the traveling profile is re-created, the vehicle travels automatically according to the re-created traveling profile. In this way, the acceleration of the vehicle does not exceed the limit value at the time of changing the traveling profile. Thus, according to the above configuration, it is possible to inhibit the acceleration of the vehicle from being increased due to the re-creation of the traveling profile.

DESCRIPTION OF EMBODIMENTS

First Embodiment

Hereinbelow, a first embodiment of a travel assist device for a vehicle is described according to FIGS. 1 to 6.

Figure 1:
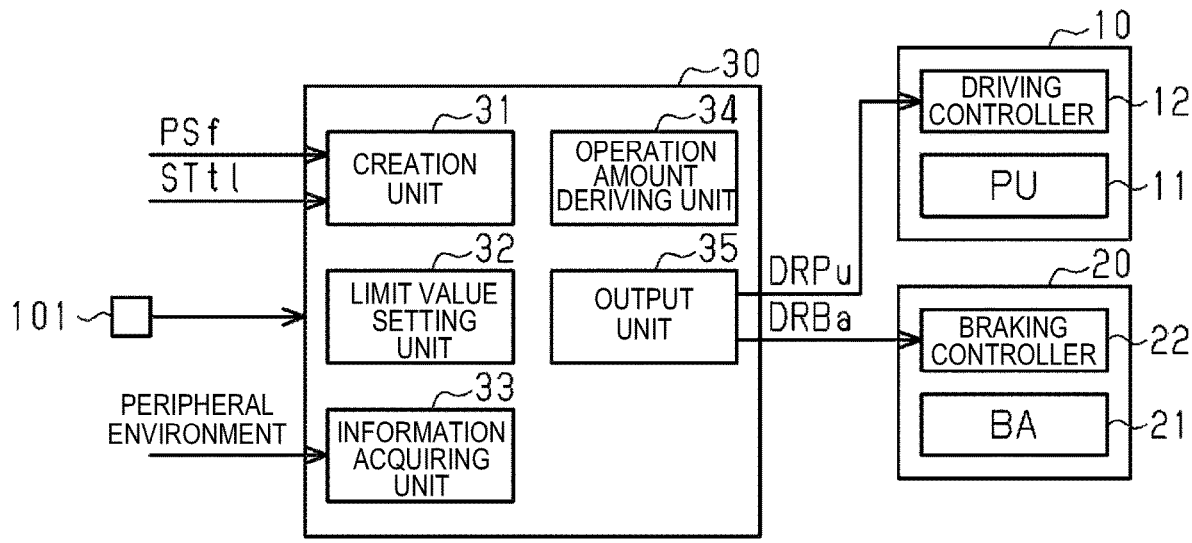
FIG. 1 is a block diagram illustrating a travel assist device for a vehicle according to a first embodiment and driving and braking devices for a vehicle.

FIG. 1 illustrates a travel assist device 30 according to this embodiment, a driving device 10 for a vehicle, and a braking device 20 for a vehicle. The driving device 10 has a power unit 11 and a driving controller 12. The power unit 11 has a power source of a vehicle such as an engine and an electric motor. The driving controller 12 is configured to adjust the driving power of the vehicle by controlling the power unit 11. The braking device 20 has a braking actuator 21 and a braking controller 22 configured to control the braking actuator 21. The braking power of the vehicle is adjusted by activating the braking actuator 21.

The travel assist device 30 has, as a functional unit that performs assist control of assisting in the automatic traveling of the vehicle to a final target position PSf, a creation unit 31, a limit value setting unit 32, an information acquiring unit 33, an operation amount deriving unit 34, and an output unit 35.

The creation unit 31 is configured to create a traveling profile PRVTtl based on the final target position PSf and a total traveling distance STtl which is a traveling distance of the vehicle from an initial position PSi to the final target position PSf. The initial position PSi is a position of the vehicle at the time of start of the automatic traveling of the vehicle according to the traveling profile PRVTtl. The traveling profile PRVTtl is an index of a change in a state amount on a vehicle velocity of the vehicle with respect to the lapse of time since the time when the vehicle passes through the initial position PSi. In this embodiment, an index of a change in a vehicle velocity V with respect to the lapse of time is created as the traveling profile PRVTtl. In other words, the vehicle velocity V is an example of the "state amount". A process of creating the traveling profile PRVTtl is to be described later.

The creation unit 31 is also configured to re-create the traveling profile PRVTtl if a predetermined re-creation condition is satisfied under a situation in which the vehicle travels automatically according to the traveling profile PRVTtl. A process of re-creating the traveling profile PRVTtl is to be described later.

The limit value setting unit 32 is configured to set a limit value Gave of a vehicle acceleration G, which is the acceleration of the vehicle, at the time of re-creating the traveling profile PRVTtl. A process of setting the limit value Gave is to be described later.

The information acquiring unit 33 is configured to acquire information on vehicle peripheral environment. Examples of such peripheral environment include whether or not an obstacle is present near the vehicle, the distance between the vehicle and the obstacle, and the width of a road on which the vehicle travels. For example, by comparing the latest information with the previous information among information acquired by the information acquiring unit 33, it is possible to detect that there is a change in the peripheral environment if the amount of change between the latest information and the previous information is equal to or larger than a predetermined value.

The operation amount deriving unit 34 is configured to derive at least one of an operation amount DRPu of the driving device 10 and an operation amount DRBa of the braking device 20 based on a state amount deviation which is the deviation between a target state amount being a target of the state amount and an actual state amount. The target state amount is acquired from the traveling profile PRVTtl. In this embodiment, the traveling profile PRVTtl is an index of a change in the vehicle velocity V with respect to the lapse of time, and thus a target vehicle velocity VTr is acquired from the traveling profile PRVTtl as the target state amount, and then the deviation between the target vehicle velocity VTr and the actual vehicle velocity V is calculated as a state amount deviation ΔSQ. The actual vehicle velocity V can be derived based on a detection signal from a wheel velocity sensor 101 provided in the vehicle, for example.

The output unit 35 is configured to output the operation amount DRPu of the driving device 10, derived by the operation amount deriving unit 34, to the driving controller 12. The output unit 35 is configured to output the operation amount DRBa of the braking device 20, derived by the operation amount deriving unit 34, to the braking controller 22.

Upon input of the operation amount DRPu of the driving device 10 into the driving controller 12, the driving controller 12 controls the power unit 11 based on the operation amount DRPu thus input. Upon input of the operation amount DRBa of the braking device 20 into the braking controller 22, the braking controller 22 controls the braking actuator 21 based on the operation amount DRBa thus input. Activating the power unit 11 and the braking actuator 21 in this manner enables the vehicle to travel automatically according to the traveling profile PRVTtl.

Figure 2:
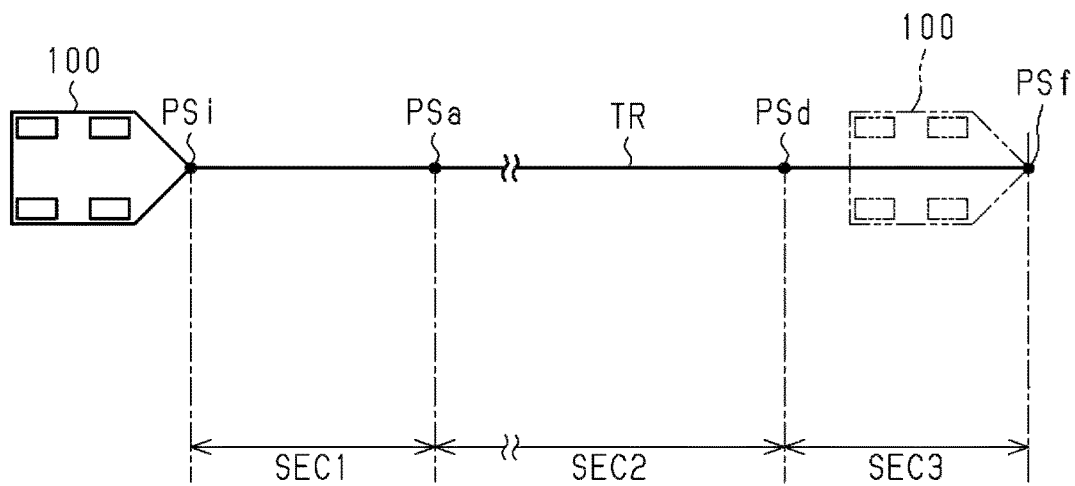
FIG. 2 is a schematic diagram illustrating a traveling route taken at the time of causing a vehicle to travel automatically from an initial position to a final target position.

Next, with reference to FIGS. 2 and 3, the process of creating the traveling profile PRVTtl is described. Here, as an example of the creation process, a description is given of the creation process in the case of starting a vehicle 100 from a position illustrated by a solid line in FIG. 2 and stopping the vehicle 100 at positions illustrated by chain double-dashed lines in FIG. 2.

In this case, a solid line arrow in FIG. 2 is a traveling route TR of the vehicle, a start point of the traveling route TR is the initial position PSi, and an end point of the traveling route TR is the final target position PSf. Meanwhile, the section between the initial position PSi and an acceleration end position PSa is an acceleration section SEC1 for accelerating the vehicle 100. The acceleration end position PSa is set between the initial position PSi and the final target position PSf. In addition, the section between a deceleration start position PSd and the final target position PSf is a deceleration section SEC3 for decelerating the vehicle 100. The deceleration start position PSd is set between the acceleration end position PSa and the final target position PSf. Besides, the section between the acceleration end position PSa and the deceleration start position PSd is a constant velocity section SEC2 for causing the vehicle 100 to travel at a constant velocity.

Figure 3A:
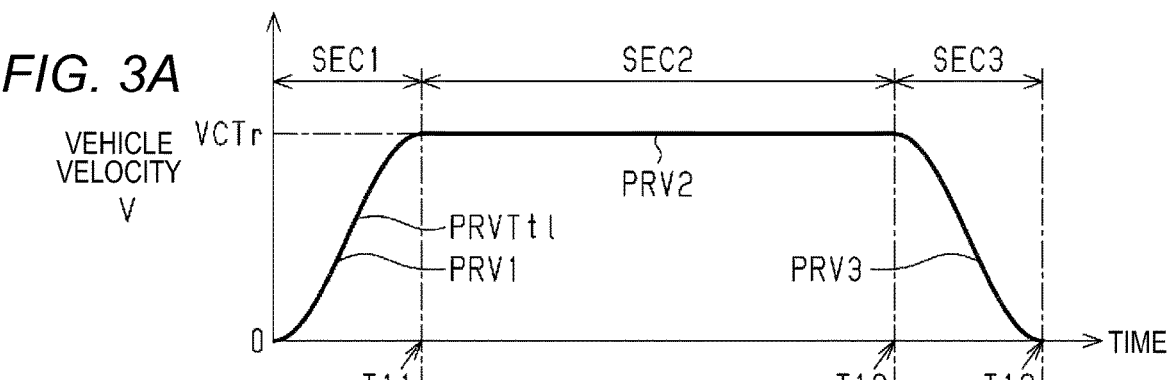
FIG. 3A is a graph illustrating a traveling profile from the initial position to the final target position.

FIG. 3A illustrates an example of the traveling profile PRVTtl in the case of accelerating the vehicle 100 to a certain vehicle velocity V, then causing the vehicle 100 to travel at a constant velocity of the certain vehicle velocity V, and then decelerating and stopping the vehicle 100. In FIG. 3A, a timing T11 corresponds to the time when the vehicle 100 arrives at the acceleration end position PSa. In addition, a timing T12 corresponds to the time when the vehicle 100 arrives at the deceleration start position PSd. Further, a timing T13 corresponds to the time when the vehicle 100 arrives at the final target position PSf.

Figure 3B:
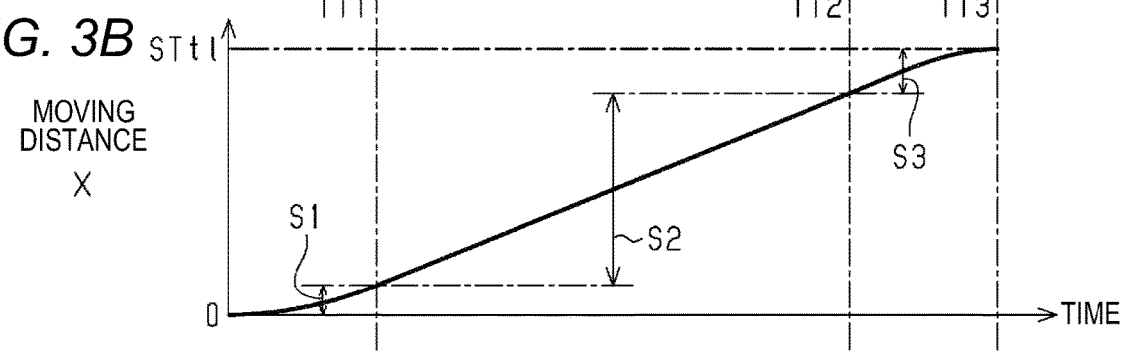
FIG. 3B is a graph illustrating the transition of a moving distance of the vehicle observed when the vehicle travels according to the traveling profile.
Figure 3C:
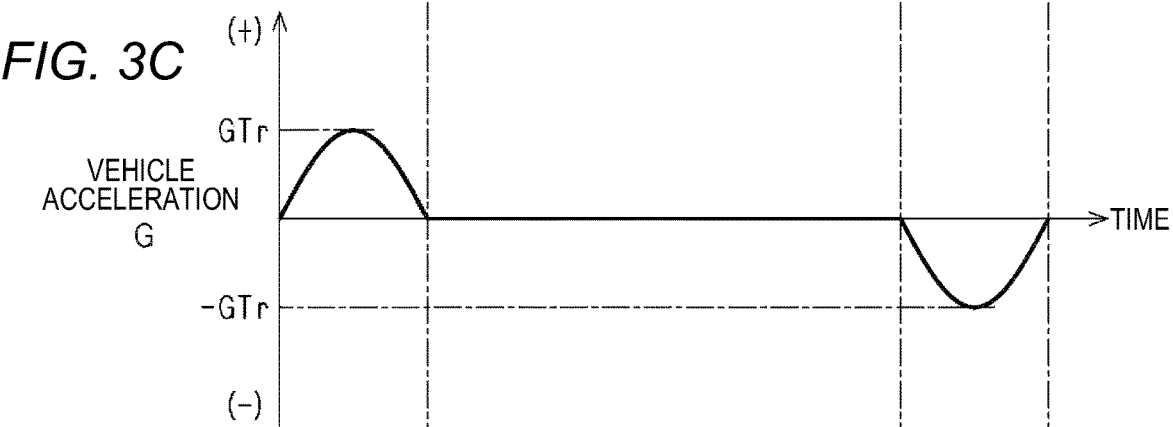
FIG. 3C is a graph illustrating the transition of the acceleration of a vehicle body observed when the vehicle travels according to the traveling profile.
Figure 3D:
FIG. 3D is a graph illustrating the transition of jerk observed when the vehicle travels according to the traveling profile.

Note that, FIG. 3B illustrates the transition of a moving distance X of the vehicle 100 observed when the vehicle 100 travels according to the traveling profile PRVTtl illustrated in FIG. 3A. Meanwhile, FIG. 3C illustrates the transition of the vehicle acceleration G of the vehicle 100 observed when the vehicle 100 travels according to the traveling profile PRVTtl illustrated in FIG. 3A. FIG. 3D illustrates the transition of jerk J of the vehicle 100 observed when the vehicle 100 travels according to the traveling profile PRVTtl illustrated in FIG. 3A.

In the traveling profile PRVTtl illustrated in FIG. 3A, a traveling profile PRV1 in the acceleration section SEC1 is for increasing the vehicle velocity V to a target vehicle velocity during constant velocity traveling VCTr. The target vehicle velocity during constant velocity traveling VCTr is the target vehicle velocity VTr in the constant velocity section SEC2. As illustrated in FIG. 3C, the traveling profile PRV1 increases the vehicle acceleration G with the lapse of time, and decreases the vehicle acceleration G to "0 (zero)"

with the lapse of time since the vehicle acceleration G reaches its maximum value. For example, the traveling profile PRV1 is created so that the vehicle acceleration G becomes the maximum at an intermediate point of the acceleration section SEC1.

In the traveling profile PRVTtl illustrated in FIG. 3A, a traveling profile PRV2 in the constant velocity section SEC2 is for keeping the vehicle velocity V at the target vehicle velocity during constant velocity traveling VCTr.

In the traveling profile PRVTtl illustrated in FIG. 3A, a traveling profile PRV3 in the deceleration section SEC3 is for decreasing the vehicle velocity V from the target vehicle velocity during constant velocity traveling VCTr to "0". Specifically, as illustrated in FIG. 3C, the traveling profile PRV3 decreases the vehicle acceleration G with the lapse of time, and increases the vehicle acceleration G to "0 (zero)" with the lapse of time since the vehicle acceleration G reaches its minimum value. For example, the traveling profile PRV3 is created so that the vehicle acceleration G becomes the minimum at an intermediate point of the deceleration section SEC3.

A description is given of how to create the traveling profile PRV1 in the acceleration section SEC1. In the case of creating the traveling profile PRV1, for example, the above initial position PSi corresponds to a "start position PSs", and the above acceleration end position PSa corresponds to a "target position PSt". The moving distance X of the vehicle 100 from the initial position PSi and the vehicle velocity V, vehicle acceleration G, and jerk J of the vehicle are an example of the state amount on the vehicle velocity of the vehicle and can be derived using the following relational formulae (Formula 1) to (Formula 4). Note that, in the relational formulae (Formula 1) to (Formula 4), "t" indicates the time having elapsed since the start of the automatic traveling of the vehicle 100 from the initial position PSi.

[Mathematical Formula 1]

$$X = X(t) = c0 + C1 \cdot t + C2 \cdot t^2 + C3 \cdot t^3 + C4 \cdot t^4 = C5 \cdot t^5 + C6 \cdot t^6 + C7 \cdot t^7 \quad \text{Formula 1}$$

$$V = V(t) = C1 + 2 \cdot C2 \cdot t + 3 \cdot C3 \cdot t^2 + 4 \cdot C4 \cdot t^3 + 5 \cdot C5 \cdot t^4 + 6 \cdot C6 \cdot t^5 + 7 \cdot C7 \cdot t^6 \quad \text{Formula 2}$$

$$G = G(t) = 2 \cdot C2 + 6 \cdot C3 \cdot t + 12 \cdot C4 \cdot t^2 + 20 \cdot C5 \cdot t^3 + 30 \cdot C6 \cdot t^4 + 42 \cdot C7 \cdot t^5 \quad \text{Formula 3}$$

$$L = JG(t) = 6 \cdot C3 + 24 \cdot C4 \cdot t + 60 \cdot C5 \cdot t^2 + 120 \cdot C6 \cdot t^3 + 210 \cdot C7 \cdot t^4 \quad \text{Formula 4}$$

These relational formulae (Formula 1) to (Formula 4) are seventh degree or smaller polynomial functions with respect to the above time t. Eight coefficients C0 to C7 can be derived by eight different constraint conditions provided by these relational formulae (Formula 1) to (Formula 4). As the constraint conditions, the moving distance X, vehicle velocity V, vehicle acceleration G, and jerk J between two different positions are used. Examples of the two different positions include the initial position PSi and the acceleration end position PSa. The moving distance X(ts), vehicle velocity V(ts), vehicle acceleration G(ts), and jerk J(ts) of the vehicle at the initial position PSi and the moving distance X(te), vehicle velocity V(te), vehicle acceleration G(te), and jerk J(te) of the vehicle at the acceleration end position PSa can be represented by a determinant as in the following relational formula (Formula 5).

[Mathematical Formula 2]

$$\begin{pmatrix} X(ts) \\ V(ts) \\ G(ts) \\ J(ts) \\ X(te) \\ V(te) \\ G(te) \\ J(te) \end{pmatrix} = \begin{pmatrix} 1 & 0 & 0 & 0 & 0 & 0 & 0 & 0 \\ 0 & 1 & 0 & 0 & 0 & 0 & 0 & 0 \\ 0 & 0 & 2 & 0 & 0 & 0 & 0 & 0 \\ 0 & 0 & 0 & 6 & 0 & 0 & 0 & 0 \\ 1 & te & te^2 & te^3 & te^4 & te^5 & te^6 & te^7 \\ 0 & 1 & 2te & 3te^2 & 4te^3 & 5te^5 & 6te^6 & 7te^7 \\ 0 & 0 & 2 & 6te & 12te^2 & 20te^3 & 30te^4 & 42te^5 \\ 0 & 0 & 0 & 6 & 24te & 60t^2 & 120te^3 & 210te^4 \end{pmatrix} \begin{pmatrix} c0 \\ c1 \\ c2 \\ c3 \\ c4 \\ c5 \\ c6 \\ c7 \end{pmatrix} \quad \text{Formula 5}$$

Known values or set values are substituted into the moving distance X(ts), X(te), the vehicle velocity V(ts), V(te), the vehicle acceleration G(ts), G(te), the jerk J(ts), J(te), and the time ts, te. The "set values" mentioned here are values determined by the vehicle model, for example. Thus, the above coefficients C0 to C7 can be derived by an arithmetical operation using an inverse matrix. Note that, the moving distance X(t1) of the vehicle 100 in the case in which the time t is "t1" can be represented as in the following relational formula (Formula 6). By comparing the relational formula (Formula 6) with the relational formula (Formula 1), it is possible to understand that the coefficients C0 to C7 can be represented by known values or set values.

[Mathematical Formula 3]

$$X(t1) = X(ts) + V(ts) \cdot t1 + \frac{1}{2} \cdot G(ts) \cdot t1^2 + \quad \text{Formula 6}$$

$$\frac{1}{6} \cdot J(ts) \cdot t1^3 + \frac{1}{6 \cdot te^4} \cdot \left( -4 \cdot J(ts) \cdot te^3 - 30 \cdot G(ts) \cdot te^2 - 120 \cdot V(ts) \cdot te - 210 \cdot X(ts) + 210 \cdot X(te) \right) \cdot t1^4 +$$

$$\frac{1}{2 \cdot te^5} \cdot \left( 2 \cdot J(ts) \cdot te^3 + 20 \cdot G(ts) \cdot te^2 + 90 \cdot V(ts) \cdot te + 168 \cdot X(ts) - 168 \cdot X(ts) \right) \cdot t1^5 +$$

$$\frac{1}{6 \cdot te^6} \cdot \left( -4 \cdot J(ts) \cdot te^3 - 45 \cdot G(ts) \cdot te^2 - 216 \cdot V(ts) \cdot te - 420 \cdot X(ts) + 420 \cdot X(te) \right) \cdot t1^6 +$$

$$\frac{1}{6 \cdot te^7} \cdot \left( J(ts) \cdot te^3 + 12 \cdot G(ts) \cdot te^2 + 60 \cdot V(ts) \cdot te + 120 \cdot X(ts) - 120 \cdot X(te) \right) \cdot t1^7$$

The time te that the vehicle 100 requires since starting at the initial position PSi until arriving at the acceleration end position PSa is set according to the traveling distance from the initial position PSi to the acceleration end position PSa. In other words, the longer the traveling distance, the longer the time te. In addition, when an upper limit value GLm is set for the vehicle acceleration G in the acceleration section SEC1, the time te also varies according to the upper limit value GLm. In other words, the smaller the upper limit value GLm, the longer the time te. Further, the time te also varies according to the target vehicle velocity during constant velocity traveling VCTr. In other words, the higher the target vehicle velocity during constant velocity traveling VCTr, the longer the time te.

In this embodiment, the traveling profile PRV1 in the acceleration section SEC1 is created by using the above relational formula (Formula 2). Specifically, in the relational formula (Formula 2), the traveling profile PRV1 is the transition of the vehicle velocity V(t) in the case of varying the time t from the time "ts" to the time "te".

Next, a description is given of how to create the traveling profile PRV2 in the constant velocity section SEC2. In the case of creating the traveling profile PRV2, for example, the acceleration end position PSa corresponds to the "start position PSs", and the deceleration start position PSd corresponds to the "target position PSt". The constant velocity section SEC2 is the section where the vehicle velocity V is kept at the target vehicle velocity during constant velocity traveling VCTr. Thus, the vehicle velocity V(t) is set at the target vehicle velocity during constant velocity traveling VCTr. Hence, the vehicle acceleration G(t) and the jerk J(t) are each set at "0 (zero)". In addition, the moving distance X(t) becomes longer with the lapse of time and with a speed according to the target vehicle velocity during constant velocity traveling VCTr.

Next, a description is given of how to create the traveling profile PRV3 in the deceleration section SEC3. In the case of creating the traveling profile PRV3, for example, the deceleration start position PSd corresponds to the "start position PSs", and the final target position PSf corresponds to the "target position PSt". The traveling profile PRV3 in the deceleration section SEC3 can be created in the same way as the traveling profile PRV1 in the acceleration section SEC1. Specifically, the moving distance X(ta), vehicle velocity V(ta), vehicle acceleration G(ta), and jerk J(ta) at the deceleration start position PSd are calculated by using the above relational formulae (Formula 1) to (Formula 4). The time ta is the time that the vehicle 100 requires since starting at the initial position PSi until arriving at the deceleration start position PSd. In addition, the moving distance X(tb), vehicle velocity V(tb), vehicle acceleration G(tb), and jerk J(tb) at the final target position PSf are calculated. The time tb is the time that the vehicle 100 requires since starting at the initial position PSi until arriving at the final target position PSf. In this embodiment, the vehicle velocity V(ta) is equal to the target vehicle velocity during constant velocity traveling VCTr, and the vehicle velocity V(tb) is equal to "0 (zero)".

Then, in the same manner as in the case of deriving the coefficients C0 to C7 using the above relational formula (Formula 6), coefficients C0 to C7 in the case of creating the traveling profile PRV3 in the deceleration section SEC3 are derived. By substituting these coefficients C0 to C7 derived in this manner into the above relational formula (Formula 2), the traveling profile PRV3 is created. Specifically, in the relational formula (Formula 2), the traveling profile PRV3 is the transition of the vehicle velocity V(t) in the case of varying the time t from the time "ta" to the time "tb".

Figure 4:
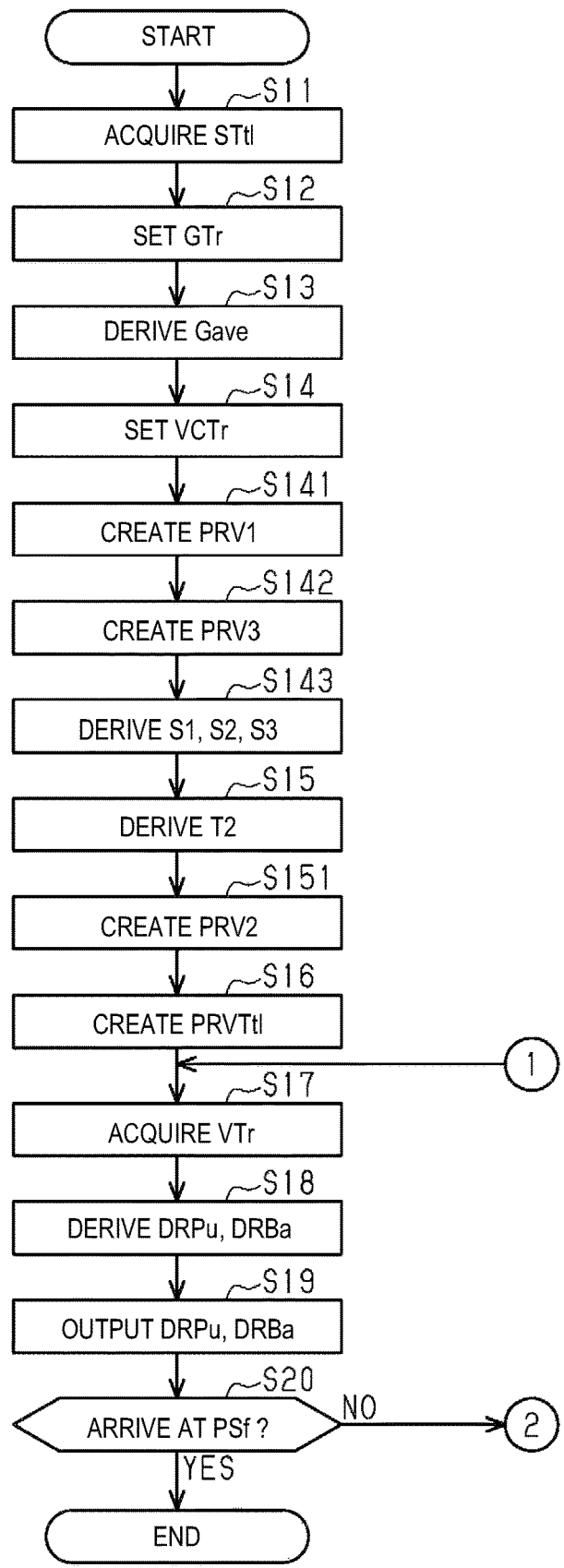
FIG. 4 is a first half portion of a flowchart explaining a process routine to be executed by the travel assist device.
Figure 5:
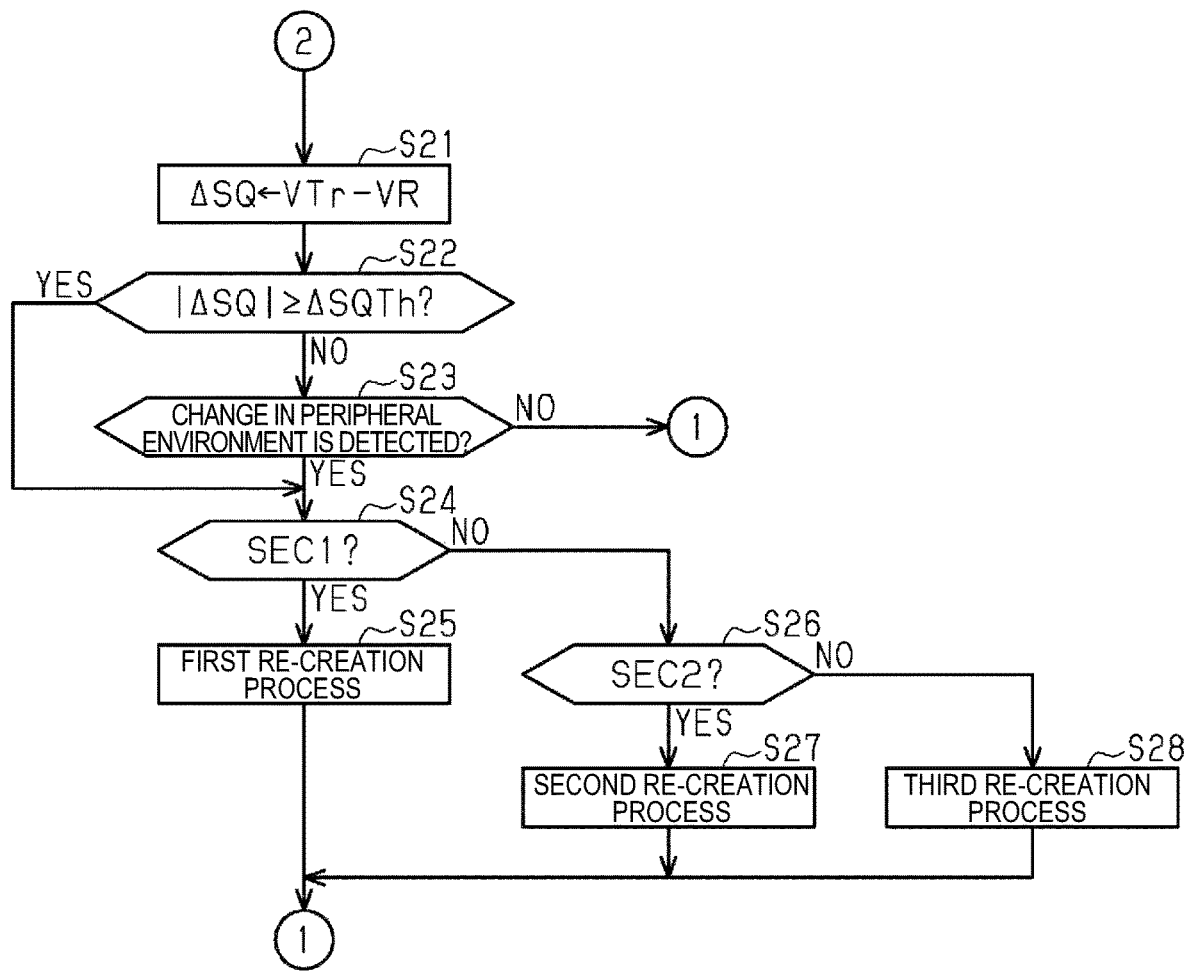
FIG. 5 is a second half portion of the flowchart explaining the process routine.

Next, with reference to FIGS. 4 and 5, a description is given of a process routine used when the travel assist device 30 performs assist control. This process routine is executed under conditions in which the travel assist device 30 receives information on the final target position PSf and the total traveling distance STtl.

In this process routine, at Step S11, the total traveling distance STtl is acquired. Then, at Step S12, a maximum value GTr of the vehicle acceleration G in the acceleration section SEC1 is set. Specifically, the maximum value GTr of the vehicle acceleration is derived by using a map or table indicating the relationship between the total traveling distance STtl and the vehicle acceleration G. Accordingly, the maximum value GTr becomes a value according to the total traveling distance STtl. For example, the maximum value GTr is set so as to become larger as the total traveling distance STtl becomes longer.

Subsequently, at next Step S13, the limit value setting unit 32 sets the limit value Gave. In this embodiment, the limit value Gave is set based on the maximum value GTr set at Step S12. For example, the limit value Gave is derived by using the following relational formula (Formula 7). In this case, the limit value Gave becomes larger as the maximum value GTr becomes larger. The traveling profile PRVTtl is created so that the vehicle acceleration G is equal to or smaller than the maximum value GTr at the time of causing the vehicle 100 to travel automatically according to this traveling profile PRVTtl, which is to be described in detail later. Accordingly, it can be said that the limit value Gave is set at a value according to the traveling profile PRVTtl in this embodiment.

[Mathematical Formula 4]

$$Gave = GTr/2 \qquad \text{Formula 7}$$

Next, at Step S14, the target vehicle velocity during constant velocity traveling VCTr is set. The target vehicle velocity during constant velocity traveling VCTr is derived by using a map or table indicating the relationship between the total traveling distance STtl and the target vehicle velocity during constant velocity traveling VCTr. Accordingly, the target vehicle velocity during constant velocity traveling VCTr becomes a value according to the total traveling distance STtl. For example, the target vehicle velocity during constant velocity traveling VCTr is set so as to become higher as the total traveling distance STtl becomes longer.

Subsequently, at Step S141, the creation unit 31 creates the traveling profile PRV1 in the acceleration section SEC1. The traveling profile PRV1 is created so that the vehicle acceleration G does not exceed the maximum value GTr in the acceleration section SEC1. Specifically, the traveling profile PRV1 is created so that the vehicle acceleration G is equal to the maximum value GTr at an intermediate position of the acceleration section SEC1. By setting proper values respectively as the coefficients C0 to C7 used in the above relational formula (Formula 2) and the like, it is possible to create the traveling profile PRV1 such that the vehicle acceleration G is equal to the maximum value GTr at the intermediate position of the acceleration section SEC1.

Next, at Step S142, the creation unit 31 creates the traveling profile PRV3 in the deceleration section SEC3. The traveling profile PRV3 is created so that the vehicle acceleration G does not fall below the product of the maximum value GTr and "−1" in the deceleration section SEC3. Specifically, the traveling profile PRV3 is created so that the vehicle velocity G is equal to the product of the maximum value GTr and "−1" at an intermediate position of the deceleration section SEC3. By setting proper values respectively as the coefficients C0 to C7 used in the above relational formula (Formula 2) and the like, it is possible to create the traveling profile PRV3 such that the vehicle velocity G is equal to the product of the maximum value GTr and "−1" at the intermediate position of the deceleration section SEC3.

Then, at Step S143, the creation unit 31 derives an acceleration traveling distance S1, a constant velocity traveling distance S2, and a deceleration traveling distance S3. The acceleration traveling distance S1 is, out of the total traveling distance STtl, the traveling distance from the initial position PSi to the acceleration end position PSa. The constant velocity traveling distance S2 is, out of the total traveling distance STtl, the traveling distance from the acceleration end position PSa to the deceleration start position PSd. The deceleration traveling distance S3 is, out of the total traveling distance STtl, the traveling distance from the deceleration start position PSd to the final target position PSf. The acceleration traveling distance S1 is derived based on the traveling profile PRV1 in the acceleration section SEC1 created at Step S141. In addition, the deceleration traveling distance S3 is derived based on the traveling profile PRV3 in the deceleration section SEC3 created at Step S142. Further, the constant velocity traveling distance S2 is derived based on the total traveling distance STtl, the acceleration traveling distance S1, and the deceleration traveling distance S3. Specifically, the constant velocity traveling distance S2 can be derived by using the following relational formula (Formula 8).

[Mathematical Formula 5]

$$S2=STtl-(S1+S3)$$ Formula 8

Subsequently, at Step S15, the creation unit 31 derives a constant velocity traveling period T2 which is the length of time of the constant velocity section SEC2. The constant velocity traveling period T2 is derived by dividing the constant velocity traveling distance S2 by the target vehicle velocity during constant velocity traveling VCTr. Thus, the longer the constant velocity traveling distance S2, the longer the constant velocity traveling period T2. In addition, the lower the target vehicle velocity during constant velocity traveling VCTr, the longer the constant velocity traveling period T2. Then, at Step S151, the creation unit 31 creates the traveling profile PRV2 in the constant velocity section SEC2 based on the constant velocity traveling period T2 and the target vehicle velocity during constant velocity traveling VCTr. The traveling profile PRV2 is created so that the vehicle velocity V is kept at the target vehicle velocity during constant velocity traveling VCTr in the section from the acceleration end position PSa to the deceleration start position PSd.

Next, at Step S16, the creation unit 31 creates the traveling profile PRVTtl from the initial position PSi to the final target position PSf. Specifically, the creation unit 31 creates the traveling profile PRVTtl by connecting the traveling profile PRV1 in the acceleration section SEC1, the traveling profile PRV2 in the constant velocity section SEC2, and the traveling profile PRV3 in the deceleration section SEC3. In other words, the creation process of the traveling profile PRVTtl is configured by Steps S141 to S143, S15, S151, and S16. The process transitions to Step S17 once the creation of the traveling profile PRVTtl is over.

At Step S17, the current target vehicle velocity VTr is acquired as the target state amount from the traveling profile PRVTtl thus created. Specifically, among the vehicle velocity V indicated by the traveling profile PRVTtl, the vehicle velocity V corresponding to the time t since the time when the vehicle 100 passes through the initial position PSi is acquired as the target vehicle velocity VTr. Accordingly, when the vehicle is in the acceleration section SEC1, the target vehicle velocity VTr becomes higher with the lapse of time. When the vehicle is in the constant velocity section SEC2, the target vehicle velocity VTr is kept at the target vehicle velocity during constant velocity traveling VCTr irrespective of the lapse of time. When the vehicle is in the deceleration section SEC3, the target vehicle velocity VTr becomes lower with the lapse of time. Subsequently, at Step S18, the operation amount deriving unit 34 derives the operation amount DRPu of the driving device 10 and the operation amount DRBa of the braking device 20. At next Step S19, the output unit 35 outputs the operation amount DRPu to the driving controller 12, and outputs the operation amount DRBa to the braking controller 22. Thereby, traveling control of the vehicle 100 is performed according to the traveling profile PRVTtl.

Then, at Step S20, it is judged whether or not the vehicle 100 has arrived at the final target position PSf. For example, if it can be judged that a traveling distance XR of the vehicle 100 by the automatic traveling of the vehicle 100 from the initial position PSi is equal to the total traveling distance STtl, that means the vehicle 100 has arrived at the final target position PSf. If it is not judged that the vehicle 100 has arrived at the final target position PSf (S20: NO), the process transitions to next Step S21. On the other hand, if it is judged that the vehicle has arrived at the final target position (S20: YES), this process routine is terminated, that is, the assist control is terminated.

At Step S21, a value obtained by subtracting an actual vehicle velocity VR from the current target vehicle velocity VTr is calculated as the state amount deviation ΔSQ. At next Step S22, it is judged whether or not an absolute value of the state amount deviation ΔSQ is equal to or larger than a judgment difference ΔSQTh. The absolute value of the state amount deviation |ΔSQ| is the difference between the current target vehicle velocity VTr and the actual vehicle velocity VR. The judgment difference ΔSQTh is set as a reference for judging whether or not a deviation between the current target vehicle velocity VTr and the actual vehicle velocity VR is large. Thus, if the absolute value of the state amount deviation |ΔSQ| is equal to or larger than the judgment difference ΔSQTh, it can be judged that the traveling profile PRVTtl needs to be re-created and the re-creation condition is satisfied.

At Step S22, if the absolute value of the state amount deviation |ΔSQ| is equal to or larger than the judgment difference ΔSQTh (YES), the process transitions to Step S24 to be described later. In this case, the process of re-creating the traveling profile PRVTtl is executed. On the other hand, if the absolute value of the state amount deviation |ΔSQ| is smaller than the judgment difference ΔSQTh (S22: NO), the process transitions to next Step S23. At Step S23, based on the information on the vehicle 100's peripheral environment acquired by the information acquiring unit 33, it is judged whether or not a change in the vehicle 100's peripheral environment is detected. For example, if the width of a road on which the vehicle 100 travels is changed, the change in the vehicle 100's peripheral environment is detected. In addition, if an obstacle located near the vehicle 100 is moved, the change in the vehicle 100's peripheral environment is detected. If the vehicle 100's peripheral environment is changed, it can be judged that the traveling profile PRVTtl needs to be re-created and the re-creation condition is satisfied. In other words, in this embodiment, even if the absolute value of the state amount deviation |ΔSQ| is smaller than the judgment difference ΔSQTh, the traveling profile PRVTtl is re-created if the change in the vehicle 100's peripheral environment is detected.

If it is judged that the change in the vehicle 100's peripheral environment is detected (S23: YES), the process transitions to next Step S24. In this case, the process of re-creating the traveling profile PRVTtl is executed. On the other hand, if it is not judged that the change in the vehicle 100's peripheral environment is detected (S23: NO), the process transitions to Step S17 described above. In other words, the process of re-creating the traveling profile PRVTtl is not executed, and the vehicle control according to the current traveling profile PRVTtl is kept.

At Step S24, it is judged whether or not the vehicle is in the acceleration section SEC1. If the target vehicle velocity VTr is acquired from the traveling profile PRV1 in the acceleration section SEC1, that means the vehicle is in the acceleration section SEC1. If it is judged that the vehicle is in the acceleration section SEC1 (S24: YES), the process transitions to next Step S25. At Step S25, the creation unit 31 executes a first re-creation process as the process of re-creating the traveling profile PRVTtl. The first re-creation process is to be described later. Then, when the re-creation of the traveling profile PRVTtl is over, the process transitions to Step S17 to be described later.

On the other hand, if it is not judged that the vehicle is in the acceleration section SEC1 (NO) at Step S24, the process transitions to next Step S26. At Step S26, it is judged whether or not the vehicle is in the constant velocity section SEC2. If the target vehicle velocity VTr is acquired from the traveling profile PRV2 in the constant velocity section SEC2, that means the vehicle is in the constant velocity section SEC2. If it is judged that the vehicle is in the constant velocity section SEC2 (S26: YES), the process transitions to next Step S27. At Step S27, the creation unit 31 executes a second re-creation process as the process of re-creating the traveling profile PRVTtl. The second re-creation process is to be described later. Then, when the re-creation of the traveling profile PRVTtl is over, the process transitions to Step S17 to be described later.

On the other hand, if it is not judged that the vehicle is in the constant velocity section SEC2 (NO) at Step S26, that means the vehicle is in the deceleration section SEC3, and thus the process transitions to next Step S28. At Step S28, the creation unit 31 executes a third re-creation process as the process of re-creating the traveling profile PRVTtl. The third re-creation process is to be described later. Then, when the re-creation of the traveling profile PRVTtl is over, the process transitions to Step S17 to be described later.

Next, the first re-creation process is described with reference to FIG. 6.

In the first re-creation process, using the limit value Gave derived at Step S13 above, the traveling profile PRVTtl is re-created so that the target vehicle velocity during constant velocity traveling VCTr, an acceleration period T1, the constant velocity traveling period T2, and a deceleration period T3 are changed. The acceleration period T1 is the length of time of the acceleration section SEC1, and the deceleration period T3 is the length of time of the deceleration section SEC3.

If the first re-creation process is executed because the absolute value of the state amount deviation |ΔSQ| is equal to or larger than the judgment difference ΔSQTh, the target vehicle velocity during constant velocity traveling VCTr is corrected according to the state amount deviation ΔSQ. If the state amount deviation ΔSQ is a positive value, the target vehicle velocity during constant velocity traveling VCTr is corrected to be increased. Specifically, if the state amount deviation ΔSQ is a positive value, the target vehicle velocity during constant velocity traveling VCTr is corrected to be increased in such a way that the amount of increase of the target vehicle velocity during constant velocity traveling becomes larger as the state amount deviation ΔSQ becomes larger. If the state amount deviation ΔSQ is a negative value, the target vehicle velocity during constant velocity traveling VCTr is corrected to be decreased. Specifically, if the state amount deviation ΔSQ is a negative value, the target vehicle velocity during constant velocity traveling VCTr is corrected to be decreased in such a way that the amount of decrease of the target vehicle velocity during constant velocity traveling becomes larger as the absolute value of the state amount deviation |ΔSQ| becomes larger.

Meanwhile, if the first re-creation process is executed because the change in the vehicle 100's peripheral environment is detected, the target vehicle velocity during constant velocity traveling VCTr is corrected according to how the peripheral environment is changed. For example, if a decrease in the width of a road on which the vehicle 100 travels is detected, the target vehicle velocity during constant velocity traveling VCTr is corrected to be decreased. On the other hand, if an increase in the width of a road on which the vehicle 100 travels is detected, the target vehicle velocity during constant velocity traveling VCTr is corrected to be increased. For example, if an obstacle located near the vehicle 100 comes closer to the vehicle 100, and if the number of obstacles located near the vehicle 100 increases, the target vehicle velocity during constant velocity traveling VCTr is corrected to be decreased.

In the first re-creation process, the traveling profile PRV1 in the acceleration section SEC1 since the time when it is judged that the profile needs to be re-created is re-created based on the limit value Gave and the corrected target vehicle velocity during constant velocity traveling VCTr. Specifically, the traveling profile PRV1 since the time when it is judged that the profile needs to be re-created is re-created so that the vehicle acceleration G does not exceed the limit value Gave when the traveling profile is changed and the vehicle velocity V is equal to the corrected target vehicle velocity during constant velocity traveling VCTr at the time of the end of the acceleration section SEC1. For example, the above relational formula (Formula 5) is also used at the time of the re-creation. In this event, by setting proper values respectively as the coefficients C0 to C7, it is possible to re-create the traveling profile PRV1 so that it satisfies the above condition.

In addition, in the first re-creation process, the traveling profile PRV2 in the constant velocity section SEC2 is re-created so that the vehicle 100 travels at a constant velocity of the corrected target vehicle velocity during constant velocity traveling VCTr. For example, if the target vehicle velocity during constant velocity traveling VCTr is corrected to be increased, the traveling profile PRV2 is re-created so that the constant velocity traveling period T2 is shortened. On the other hand, if the target vehicle velocity during constant velocity traveling VCTr is corrected to be decreased, the traveling profile PRV2 is re-created so that the constant velocity traveling period T2 is extended.

Further, in the first re-creation process, the traveling profile PRV3 in the deceleration section SEC3 is re-created so that the vehicle velocity V is decreased from the corrected target vehicle velocity during constant velocity traveling VCTr to "0" when the vehicle 100 travels from the deceleration start position PSd to the final target position PSf. For example, the above relational formula (Formula 5) is also used at the time of the re-creation. In this event, by setting proper values respectively as the coefficients C0 to C7, it is possible to re-create the traveling profile PRV3 so that it satisfies the above condition.

Figure 6:
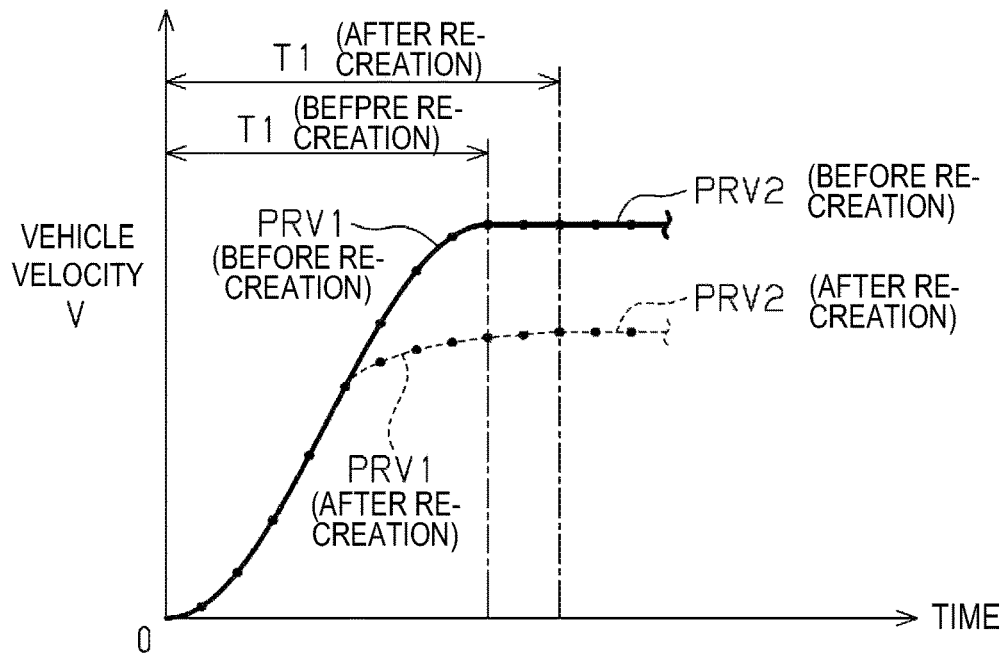
FIG. 6 is a graph in the case of re-creating the traveling profile in the first embodiment.

Note that, FIG. 6 illustrates an example of the traveling profile PRVTtl that is re-created by executing the first re-creation process. FIG. 6 illustrates the case in which the target vehicle velocity during constant velocity traveling VCTr is corrected to be decreased. A solid line in FIG. 6 illustrates the traveling profile PRVTtl before the re-creation, and a broken line in FIG. 6 illustrates the traveling profile PRVTtl that is re-created by the first re-creation process.

When the target vehicle velocity during constant velocity traveling VCTr is corrected to be decreased, the target vehicle velocity VTr is increased at a lower speed in the acceleration section SEC1 than that before the re-creation of the traveling profile PRVTtl. Thus, the time required for the vehicle 100 to arrive at the acceleration end position PSa becomes longer. In other words, according to the re-created traveling profile PRVTtl, the acceleration period T1 is extended when the target vehicle velocity during constant velocity traveling VCTr is corrected to be decreased.

In addition, when the target vehicle velocity during constant velocity traveling VCTr is corrected to be decreased, the time required for the vehicle 100 to move from the acceleration end position PSa to the deceleration start position PSd becomes longer in the constant velocity section SEC2 than that before the re-creation of the traveling profile PRVTtl. In other words, according to the re-created traveling profile PRVTtl, the constant velocity traveling period T2 is extended when the target vehicle velocity during constant velocity traveling VCTr is corrected to be decreased.

Further, when the target vehicle velocity during constant velocity traveling VCTr is corrected to be decreased, the time required for the vehicle 100 to move from the deceleration start position PSd to the final target position PSf becomes shorter in the deceleration section SEC3 than that before the re-creation of the traveling profile PRVTtl. In other words, according to the re-created traveling profile PRVTtl, the deceleration period T3 is shortened when the target vehicle velocity during constant velocity traveling VCTr is corrected to be decreased.

On the other hand, when the target vehicle velocity during constant velocity traveling VCTr is corrected to be increased, the target vehicle velocity VTr is increased at a higher speed in the acceleration section SEC1 than that before the re-creation of the traveling profile PRVTtl. In other words, according to the re-created traveling profile PRVTtl, the acceleration period T1 is shortened. In addition, according to the re-created traveling profile PRVTtl, the constant velocity traveling period T2 is shortened when the target vehicle velocity during constant velocity traveling VCTr is corrected to be increased. Further, according to the re-created traveling profile PRVTtl, the deceleration period T3 is extended when the target vehicle velocity during constant velocity traveling VCTr is corrected to be increased.

Next, the second re-creation process is described.

In the second re-creation process, the traveling profile PRV2 in the constant velocity section SEC2 is re-created so that the constant velocity traveling period T2 is changed. If the second re-creation process is executed because the absolute value of the state amount deviation |ΔSQ| is equal to or larger than the judgment difference ΔSQTh, the constant velocity traveling period T2 is corrected according to the state amount deviation ΔSQ. If the state amount deviation ΔSQ is a positive value, the constant velocity traveling period T2 is corrected so that the constant velocity traveling period T2 becomes longer as the state amount deviation ΔSQ becomes larger. If the state amount deviation ΔSQ is a negative value, the constant velocity traveling period T2 is corrected so that the constant velocity traveling period T2 becomes shorter as the absolute value of the state amount deviation |ΔSQ| becomes larger.

In the third re-creation process, the traveling profile PRV3 in the deceleration section SEC3 since the time when it is judged that the profile needs to be re-created is re-created so that the deceleration period T3 is changed. Specifically, if the third re-creation process is executed because the absolute value of the state amount deviation |ΔSQ| is equal to or larger than the judgment difference ΔSQTh, the deceleration period T3 is corrected according to the state amount deviation ΔSQ. If the state amount deviation ΔSQ is a positive value, the deceleration period T3 is corrected so that the deceleration period T3 becomes shorter as the state amount deviation ΔSQ becomes larger. If the state amount deviation ΔSQ is a negative value, the deceleration period T3 is corrected so that the deceleration period T3 becomes longer as the absolute value of the state amount deviation |ΔSQ| becomes larger.

Note that, the traveling profile PRV3 since the time when the profile needs to be re-created is re-created by using the above relational formula (Formula 5). In this event, by setting proper values respectively as the coefficients C0 to C7, it is possible to re-create the traveling profile PRV3 so that it satisfies the above condition.

Next, the operation and effect of this embodiment are described.

(1) Once the traveling profile PRVTtl is created, the target vehicle velocity VTr is acquired from the traveling profile PRVTtl, and the operation amount DRPu of the driving device 10 and the operation amount DRBa of the braking device 20 are derived respectively. Then, by controlling the power unit 11 based on the operation amount DRPu and controlling the braking actuator 21 based on the operation amount DRBa, the vehicle 100 travels automatically according to the traveling profile PRVTtl. When the vehicle 100 travels automatically according to the traveling profile PRVTtl, if the absolute value of the state amount deviation |ΔSQ| is equal to or larger than the judgment difference ΔSQTh, the traveling profile PRVTtl is re-created so that the vehicle acceleration G does not exceed the limit value Gave. Then, the vehicle 100 travels automatically according to the traveling profile PRVTtl thus re-created. In this way, the vehicle acceleration G does not exceed the limit value Gave when the traveling profile PRVTtl is changed. This makes it possible to suppress an increase in the vehicle acceleration G caused by the re-creation of the traveling profile PRVTtl.

(2) Note that, the limit value Gave is set based on the maximum value GTr of the vehicle acceleration at the time of causing the vehicle 100 to travel according to the traveling profile PRVTtl. By setting the limit value Gave in consideration of the traveling profile PRVTtl before the re-creation in this manner, it is possible to increase the effect of inhibiting the vehicle acceleration G from being changed largely when the traveling profile PRVTtl is re-created.

(3) If the traveling profile PRV2 needs to be re-created in the constant velocity section SEC2 when the vehicle 100 travels automatically according to the traveling profile PRVTtl, the traveling profile PRV2 is re-created so that the constant velocity traveling period T2 is changed. Thus, the vehicle acceleration G is not changed by the re-creation of the traveling profile PRVTtl. Accordingly, since the vehicle acceleration G is not changed when the traveling profile PRVTtl is re-created, it is possible to inhibit an occupant of the vehicle 100 from feeling a sense of discomfort.

(4) If the traveling profile PRVTtl needs to be re-created in the acceleration section SEC1 when the vehicle 100 travels automatically according to the traveling profile PRVTtl, the traveling profile PRVTtl is re-created so that the target vehicle velocity during constant velocity traveling VCTr, the acceleration period T1, and the constant velocity traveling period T2 are changed. By varying the target vehicle velocity during constant velocity traveling VCTr, the acceleration period T1, and the constant velocity traveling period T2 in this manner, it is possible to suppress an increase in the vehicle acceleration G caused by the re-creation of the traveling profile PRVTtl. Thereby, it is possible to inhibit the vehicle acceleration G from being changed largely in the acceleration section SEC1, and thus possible to inhibit an occupant of the vehicle 100 from feeling a sense of discomfort when the traveling profile PRVTtl is re-created.

(5) In this embodiment, the traveling profile PRVTtl is re-created if the change in the vehicle 100's peripheral environment is detected. In other words, it is possible to provide automatic traveling of the vehicle 100 at the vehicle velocity V and the vehicle acceleration G according to the peripheral environment. Thereby, it is possible to enhance safety at the time of causing the vehicle 100 to travel automatically according to the traveling profile PRVTtl.

Second Embodiment

Next, a second embodiment of the travel assist device for a vehicle is described. The second embodiment differs from the first embodiment in that the traveling profile PRVTtl is created in consideration of a traveling mode of a vehicle. Hence, in the following description, parts different from the first embodiment are mainly described, and constituent parts which are the same as or equivalent to the first embodiment are given the same reference signs and their redundant description is omitted.

In a vehicle equipped with the travel assist device 30 of this embodiment, multiple traveling modes are prepared. As the multiple traveling modes, a first traveling mode MD1 and a second traveling mode MD2 are prepared. The first traveling mode MD1 is a normal traveling mode. The second traveling mode MD2 is a mode for enhancing the comfort of an occupant of the vehicle 100 as compared to that during traveling of the vehicle in the first traveling mode MD1. To put it differently, the second traveling mode MD2 is a mode for reducing the acceleration of the vehicle 100 as compared to the first traveling mode MD1. For example, when the vehicle 100 is caused to travel in such a way that the vehicle 100 needs to accelerate or decelerate rapidly, that means the vehicle 100 is caused to travel in the first traveling mode MD1. On the other hand, when the vehicle 100 does not need to accelerate or decelerate rapidly, that means the vehicle 100 is caused to travel in the second traveling mode MD2.

The creation unit 31 creates the traveling profile PRVTtl while taking into consideration whether the traveling mode of the vehicle 100 is the first traveling mode MD1 or the second traveling mode MD2. Specifically, when the vehicle 100 is caused to travel in the second traveling mode MD2, the creation unit 31 decreases the maximum value GTr of the vehicle velocity, which is set based on the total traveling distance STtl, as compared to the case of causing the vehicle 100 to travel in the first traveling mode MD1, and then creates the traveling profile PRV1 in the acceleration section SEC1. This prevents the vehicle acceleration G from becoming so large in the acceleration section SEC1 when the vehicle 100 is caused to travel automatically according to the traveling profile PRV1. In addition, this increases the time required for the vehicle 100 to travel from the initial position PSi to the acceleration end position PSa.

The limit value setting unit 32 corrects the limit value Gave, which is calculated by using the above relational formula (Formula 7), based on whether the traveling mode of the vehicle 100 is the first traveling mode MD1 or the second traveling mode MD2. For example, the product of the limit value Gave calculated by using the relational formula (Formula 7) and a correction coefficient α according to the traveling mode is derived as the corrected limit value Gave. For example, when the vehicle 100 is caused to travel in the second traveling mode MD2, a value larger than "0 (zero)" and smaller than "1" is set as the correction coefficient α. On the other hand, when the vehicle 100 is caused to travel in the first traveling mode MD1, a value larger than "1" is set as the correction coefficient α. In other words, the correction coefficient α in the case of causing the vehicle 100 to travel in the second traveling mode MD2 is smaller than that in the case of causing the vehicle 100 to travel in the first traveling mode MD1.

Then, by using the corrected limit value Gave in the re-creation process of the traveling profile PRVTtl, the creation unit 31 re-creates the traveling profile PRVTtl. Hence, if the vehicle is in the second traveling mode MD2, the creation unit re-creates the traveling profile PRVTtl in the acceleration section SEC1 which is effective in inhibiting the vehicle acceleration G from being raised. On the other hand, if the vehicle is in the first traveling mode MD1, the creation unit re-creates the traveling profile PRVTtl so that the vehicle acceleration G becomes larger.

Accordingly, in this embodiment, if the vehicle is in the second traveling mode MD2, the vehicle acceleration G is less likely to become large when the vehicle 100 is caused to travel automatically according to the traveling profile PRVTtl. Thereby, it is possible to further increase the effect of inhibiting an occupant of the vehicle from feeling a sense of discomfort due to too large vehicle acceleration G during the automatic traveling.

In addition, in this embodiment, even in the case of re-creating the traveling profile PRVTtl in the acceleration section SEC1, if the vehicle is in the second traveling mode MD2, it is possible to increase the effect of inhibiting the vehicle acceleration G from being increased due to the change in the traveling profile PRVTtl as compared to the case in which the vehicle is in the first traveling mode MD1.

Meanwhile, if the vehicle is in the first traveling mode MD1, when the vehicle 100 is caused to travel automatically according to the traveling profile PRVTtl, it is possible to increase the vehicle velocity G as compared to that in the second traveling mode MD2, and thereby possible to rapidly change the behavior of the vehicle 100.

Note that, here, the limit value Gave is corrected to be increased when the vehicle is in the first traveling mode MD1. However, the limit value Gave calculated by using the relational formula (Formula 7) does not necessarily have to be corrected when the vehicle is in the first traveling mode MD1 as long as the limit value Gave can be made smaller in the second traveling mode MD2 than that in the first traveling mode MD1.

Third Embodiment

Figure 7:
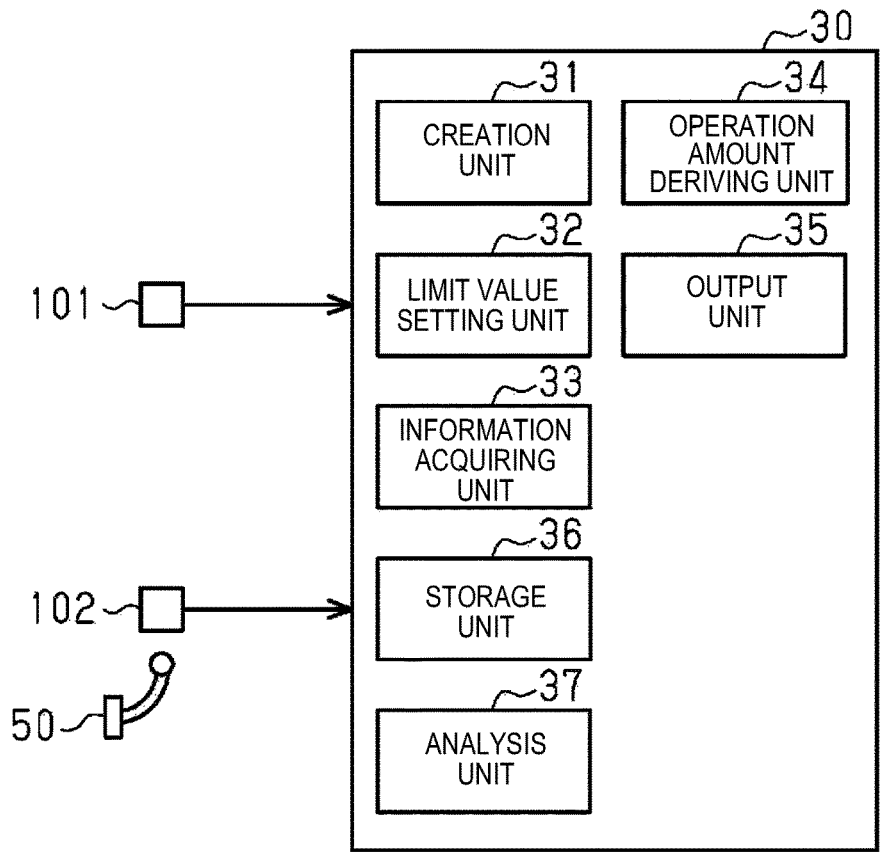
FIG. 7 is a block diagram illustrating a functional configuration of a travel assist device for a vehicle according to a third embodiment.

Next, a third embodiment of the travel assist device for a vehicle is described according to FIG. 7. The third embodiment differs from the above embodiments in that the traveling profile PRVTtl is created in consideration of a history of accelerator operation by a driver of the vehicle 100. Hence, in the following description, parts different from the above embodiments are mainly described, and constituent parts which are the same as or equivalent to the above embodiments are given the same reference signs and their redundant description is omitted.

As illustrated in FIG. 7, the travel assist device 30 has a storage unit 36 configured to store, when the vehicle 100 travels by activating the power unit 11 based on the driver's operation of an accelerator pedal 50, an accelerator operation relevant value ACC which is a value regarding how the accelerator is operated at this time. The accelerator operation relevant value ACC is a value that is derived based on a detection signal from an accelerator position sensor 102. Examples of the accelerator operation relevant value ACC include an accelerator operation amount and an accelerator operation speed.

The travel assist device 30 has an analysis unit 37 configured to analyze multiple accelerator operation relevant values ACC stored in the storage unit 36. For example, the analysis unit 37 analyzes whether chances of performing accelerator operation to accelerate the vehicle 100 rapidly are large or small.

The creation unit 31 creates the traveling profile PRVTtl while taking into consideration the analysis result of the analysis unit 37. Specifically, if the analysis result that chances of performing accelerator operation to accelerate the vehicle 100 rapidly are small is obtained, the creation unit 31 decreases the maximum value GTr of the vehicle acceleration, which is set based on the total traveling distance STtl, as compared to the case in which the analysis result that chances of performing accelerator operation to accelerate the vehicle 100 rapidly are large is obtained. Then, the creation unit 31 creates the traveling profile PRV1 in the acceleration section SEC1. Thereby, if the analysis result that chances of performing accelerator operation to accelerate the vehicle 100 rapidly are small is obtained, by causing the vehicle 100 to travel according to the traveling profile PRV1, the vehicle acceleration G is less likely to become large in the acceleration section SEC1 as compared to the case in which the analysis result that chances of performing accelerator operation to accelerate the vehicle 100 rapidly are large is obtained. In addition, this increases the time required for the vehicle 100 to travel from the initial position PSi to the acceleration end position PSa.

The limit value setting unit 32 corrects the limit value Gave, which is calculated by using the above relational formula (Formula 7), based on the analysis result of the analysis unit 37. For example, the product of the limit value Gave calculated by using the relational formula (Formula 7) and a correction coefficient β according to the analysis result is derived as the corrected limit value Gave. Specifically, if the analysis result that chances of performing accelerator operation to accelerate the vehicle 100 rapidly are small is obtained, a value larger than "0 (zero)" and smaller than "1" is set as the correction coefficient β. On the other hand, if the analysis result that chances of performing accelerator operation to accelerate the vehicle 100 rapidly are large is obtained, a value larger than "1" is set as the correction coefficient β. In other words, if the analysis result that chances of performing accelerator operation to accelerate the vehicle 100 rapidly are small is obtained, the correction coefficient β is smaller than that in the case in which the analysis result that chances of performing accelerator operation to accelerate the vehicle 100 rapidly are large is obtained.

Then, by using the corrected limit value Gave in the re-creation process of the traveling profile PRVTtl, the creation unit 31 re-creates the traveling profile PRVTtl. Hence, if the analysis result that chances of performing accelerator operation to accelerate the vehicle 100 rapidly are small is obtained, the creation unit re-creates the traveling profile PRVTtl in the acceleration section SEC1 which is effective in inhibiting the vehicle acceleration G from being increased. On the other hand, if the analysis result that chances of performing accelerator operation to accelerate the vehicle 100 rapidly are large is obtained, the creation unit re-creates the traveling profile PRVTtl so that the vehicle acceleration G becomes larger.

Accordingly, in this embodiment, if the analysis result that chances of performing accelerator operation to accelerate the vehicle 100 rapidly are small is obtained, the vehicle acceleration G is less likely to become large when the vehicle 100 is caused to travel automatically according to the traveling profile PRVTtl. Thereby, it is possible to provide automatic traveling of the vehicle 100 according to the preference of the driver.

In addition, in this embodiment, even in the case of re-creating the traveling profile PRVTtl in the acceleration section SEC1, if the analysis result that chances of performing accelerator operation to accelerate the vehicle 100 rapidly are small is obtained, it is possible to increase the effect of inhibiting the vehicle acceleration G from being increased due to the change in the traveling profile PRVTtl as compared to the case in which the analysis result that such chances are large is obtained.

Meanwhile, if the analysis result that chances of performing accelerator operation to accelerate the vehicle 100 rapidly are large is obtained, when the vehicle 100 is caused to travel automatically according to the traveling profile PRVTtl, it is possible to increase the vehicle velocity G as compared to that in the case in which the analysis result that such chances are small is obtained.

Note that, here, the limit value Gave is corrected to be increased when the analysis result that chances of performing accelerator operation to accelerate the vehicle 100 rapidly are large is obtained. However, the limit value Gave calculated by using the relational formula (Formula 7) does not necessarily have to be corrected when the analysis result that chances of performing accelerator operation to accelerate the vehicle 100 rapidly are large is obtained as long as the limit value Gave can be made smaller in the case in which the analysis result that chances of performing accelerator operation to accelerate the vehicle 100 rapidly are small is obtained than that in the case in which the analysis result that chances of performing accelerator operation to accelerate the vehicle 100 rapidly are large is obtained.

Modification Example

The above embodiments can be implemented while being modified in the following way. The above embodiments and the following modified examples can be implemented in combination with each other within a technically consistent scope.

In the above embodiments, the limit value Gave may be derived without using the above relational formula (Formula 7) as long as the limit value Gave can be set at a value according to the maximum value GTr of the vehicle acceleration. For example, a value obtained by dividing the maximum value GTr by a value other than "2" (e.g., 3) may be derived as the limit value Gave. Alternatively, a value obtained by subtracting a correction value from the maximum value GTr may be derived as the limit value Gave.

In the above first embodiment, the limit value Gave may be a preset value. In the above second embodiment, when a specified value is set as the limit value Gave before correction, the traveling profile PRVTtl may be re-created in such a way that the limit value Gave before correction is corrected according to the traveling mode and the traveling profile is re-created by using the corrected limit value Gave. Likewise, in the above third embodiment, when a specified value is set as the limit value Gave before correction, the traveling profile PRVTtl may be re-created in such a way that the limit value Gave before correction is corrected according to the analysis result of the analysis unit 37 and the traveling profile is re-created by using the corrected limit value Gave.

In the above third embodiment, the traveling profile PRVTtl may be created based on a history of driving operation, other than the accelerator operation, to change the vehicle velocity V. Examples of such driving operation include braking operation. When the traveling profile PRVTtl is created based on the history of braking operation, a braking operation relevant value which is a value corresponding to how the brake is operated is stored in the storage unit 36. Examples of the braking operation relevant value include a braking operation amount and a braking operation speed. In this case, the analysis unit 37 analyzes the frequency of braking operation to decelerate the vehicle 100 rapidly. The creation unit 31 creates the traveling profile PRVTtl while taking into consideration the frequency thus analyzed by the analysis unit 37.

Alternatively, the traveling profile PRVTtl may be created based on a history of steering which is an example of the driving operation. In this case, a steering relevant value which is a value corresponding to how the steering is performed is stored in the storage unit 36. Examples of the steering relevant value include an operation speed. The analysis unit 37 analyzes the frequency of steering to turn the vehicle 100 sharply. The creation unit 31 creates the traveling profile PRVTtl while taking into consideration the frequency thus analyzed by the analysis unit 37.

Still alternatively, the creation unit 31 may create the traveling profile PRVTtl based on a combination of the history of accelerator operation, the history of braking operation, and the history of steering of the driver.

In the above second embodiment, the target vehicle velocity during constant velocity traveling VCTr is configured so that it is not varied according to the traveling mode at the time of creating the traveling profile PRVTtl; instead, the target vehicle velocity during constant velocity traveling VCTr may be varied according to the traveling mode. For example, the target vehicle velocity during constant velocity traveling VCTr in the second traveling mode MD2 may be set lower than that in the first traveling mode MD1.

The traveling profile PRVTtl may be created without using the above relational formula (Formula 5) as long as the vehicle velocity V can be increased to the target vehicle velocity during constant velocity traveling VCTr when the traveling profile PRV1 in the acceleration section SEC1 is created.

When it is judged that the traveling profile PRVTtl needs to be re-created under a situation in which the vehicle is in the acceleration section SEC1, the traveling profile PRVTtl may be re-created so that only a part of the target vehicle velocity during constant velocity traveling VCTr, the acceleration period T1, and the constant velocity traveling period T2 is changed. For example, the traveling profile may be re-created so that the target vehicle velocity during constant velocity traveling VCTr is not changed. In this case, the traveling profile PRV2 in the constant velocity section SEC2 is changed while the traveling profile PRV1 in the acceleration section SEC1 is not changed. In other words, the constant velocity traveling period T2 is changed while the acceleration period T1 is not changed.

When the traveling profile PRV1 in the acceleration section SEC1 is created upon acquisition of the total traveling distance STtl, the traveling profile PRV1 may be completed by dividing the acceleration section SEC1 into multiple sections, creating a traveling profile for each of the divided sections, and connecting these traveling profiles to each other. For example, a description is given of an example of dividing the acceleration section SEC1 into three sections. In this case, when a traveling profile in the first section of the sections thus divided is created, the traveling profile is created with the start position PSs set at the initial position PSi and the target position PSt set at a first position which is a position between the initial position PSi and the acceleration end position PSa. When a traveling profile in the next section is created, the traveling profile is created with the start position PSs set at the above first position and the target position PSt set at a second position which is a position between the first position and the acceleration end position PSa. When a traveling profile in the next section is created, the traveling profile is created with the start position PSs set at the second position and the target position PSt set at the acceleration end position PSa.

In the above embodiments, the traveling profile PRVTtl is created so that the vehicle 100 is accelerated, then the vehicle 100 is caused to travel at a constant velocity, and then the vehicle 100 is decelerated. However, it is also possible to create the traveling profile PRVTtl such that the vehicle velocity V is increased to a certain velocity until the vehicle 100 arrives at the final target position PSf. In this case, it is also possible to set the final target position PSf as the acceleration end position PSa, and set the traveling profile PRV1 in the acceleration section SEC1 as the traveling profile PRVTtl. Alternatively, it is also possible to set a position before the final target position PSf as the acceleration end position PSa, and create the traveling profile PRVTtl based on the traveling profile PRV1 in the acceleration section SEC1 and the traveling profile PRV2 in the constant velocity section SEC2.

In the above embodiments, the traveling profile PRVTtl is created with an index of a change in the vehicle velocity V with respect to the lapse of time set as an index of a change in a state amount with respect to the lapse of time. However, an index of a state amount other than the vehicle velocity may be created as a traveling profile. For example, an index of a change in the moving distance X of the vehicle 100 with respect to the lapse of time may be created as a traveling profile. FIG. 3B illustrates an example of a traveling profile with an index of a change in the moving distance X of the vehicle 100 with respect to the lapse of time. In this case, a target moving distance is acquired from the traveling profile as a target state amount, and then the operation amount DRPu of the driving device 10 and the operation amount DRBa of the braking device 20 are derived based on the target moving distance and an actual moving distance.

Alternatively, for example, an index of a change in the vehicle acceleration G with respect to the lapse of time may be created as a traveling profile. FIG. 3C illustrates an example of a traveling profile with an index of a change in the vehicle acceleration G with respect to the lapse of time. In this case, a target vehicle acceleration is acquired from the traveling profile as a target state amount, and then the operation amount DRPu and the operation amount DRBa are derived based on the target vehicle acceleration and an actual vehicle acceleration.

Still alternatively, for example, an index of a change in the jerk J with respect to the lapse of time may be created as a traveling profile. FIG. 3D illustrates an example of a traveling profile with an index of a change in the jerk J with respect to the lapse of time. In this case, a target jerk is acquired from the traveling profile as a target state amount, and then the operation amount DRPu and the operation amount DRBa are derived based on the target jerk and an actual jerk.

In the above embodiments, the operation amount DRPu of the driving device 10 and the operation amount DRBa of the braking device 20 are derived while taking into consideration not only a target state amount but also an actual state amount. However, as long as the operation amount DRPu and the operation amount DRBa are derived based on the target state amount, the actual state amount does not necessarily have to be taken into consideration at the time of deriving the operation amount DRPu and the operation amount DRBa. Even with this configuration, if an absolute value of a state amount deviation becomes larger, the traveling profile PRVTtl is re-created, and the vehicle 100 travels automatically according to the re-created traveling profile PRVTtl. This makes it possible to cause the vehicle 100 to arrive at the final target position PSf.

Next, the technical ideas that can be understood from the above embodiments and their modification examples are described.

It is preferable to include a limit value setting unit configured to set the limit value based on the maximum value of the vehicle acceleration at the time of causing the vehicle to travel according to the traveling profile.

The invention claimed is:

1. A travel assist device for a vehicle that assists in traveling of a vehicle from a start position to a target position, comprising:
a creation unit configured to create a traveling profile, which is an index of a change in a state amount on a vehicle velocity of the vehicle with respect to the lapse of time, based on a traveling distance of the vehicle from the start position to the target position; and
an output unit configured to output an operation amount according to a target state amount, which is a target value of the state amount indicated by the traveling profile, to at least one of a driving device and a braking device of the vehicle, wherein
in a state in which the vehicle travels by driving of the at least one of the devices based on the operation amount, the creation unit re-creates the traveling profile so that acceleration of the vehicle does not exceed a predetermined limit value if a difference between an actual value of the state amount and the target state amount is equal to or larger than a judgment difference,
wherein the creation unit creates the traveling profile including an acceleration section in which the vehicle is accelerated and a constant velocity section in which the vehicle is caused to travel at a constant velocity based on a target vehicle velocity during constant velocity traveling, which is the target vehicle velocity of the vehicle in the constant velocity section, and re-creates the traveling profile, when the traveling profile is re-created in a state in which the vehicle travels by outputting the operation amount according to the acceleration section from the output unit to the at least one of the devices, so that at least one of the length of time in which the vehicle is caused to travel based on the target vehicle velocity during constant traveling, and the length of time in which the vehicle is cause to travel based on the constant velocity section, is changed.

2. The travel assist device for a vehicle according to claim 1, wherein the creation unit
when the traveling profile is re-created in a state in which the vehicle travels by outputting the operation amount according to the constant velocity section from the output unit to the at least one of the devices, the traveling profile is re-created so that the length of time in which the vehicle is caused to travel based on the constant velocity section is changed.

3. The travel assist device for a vehicle according to claim 2, further comprising
an information acquiring unit configured to acquire information on the vehicle's peripheral environment, wherein
under a situation in which the vehicle travels by outputting the operation amount, output from the output unit, to the at least one of the devices, the creation unit re-creates the traveling profile if a change in the vehicle's peripheral environment is detected even if the difference between the actual value of the state amount and the target state amount is smaller than the judgment difference.

4. The travel assist device for a vehicle according to claim 2, wherein
the vehicle is capable of traveling in a plurality of traveling modes including a first traveling mode and a second traveling mode that places a higher priority on comfort of an occupant of the vehicle than in the case of traveling in the first traveling mode, and
when the vehicle travels in the second traveling mode, the creation unit creates the traveling profile so that a maximum value of the acceleration of the vehicle at the time of causing the vehicle to travel according to the traveling profile is smaller than that in the case of causing the vehicle to travel in the first traveling mode.

5. The travel assist device for a vehicle according to claim 2, further comprising
a storage unit configured to store, when the vehicle travels in response to a driving operation by a driver, a driving operation relevant value which is a value regarding how the driving operation is, and
the creation unit creates the traveling profile so that the maximum value of the acceleration of the vehicle at the time of causing the vehicle to travel according to the traveling profile has a value based on the driving operation relevant value stored in the storage unit.

6. The travel assist device for a vehicle according to claim 2, wherein, out of the traveling profile, the creation unit creates the acceleration section, in which the vehicle is accelerated, by using a seventh degree or smaller polynomial function.

7. The travel assist device for a vehicle according to claim 1, wherein, out of the traveling profile, the creation unit creates the acceleration section, in which the vehicle is accelerated, by using a seventh degree or smaller polynomial function.

8. The travel assist device for a vehicle according to claim 1, further comprising an information acquiring unit configured to acquire information on the vehicle's peripheral environment, wherein under a situation in which the vehicle travels by outputting the operation amount, output from the output unit, to the at least one of the devices, the creation unit re-creates the traveling profile if a change in the vehicle's peripheral environment is detected even if the difference between the actual value of the state amount and the target state amount is smaller than the judgment difference.

9. The travel assist device for a vehicle according to claim 8, wherein the vehicle is capable of traveling in a plurality of traveling modes including a first traveling mode and a second traveling mode that places a higher priority on comfort of an occupant of the vehicle than in the case of traveling in the first traveling mode, and when the vehicle travels in the second traveling mode, the creation unit creates the traveling profile so that a maximum value of the acceleration of the vehicle at the time of causing the vehicle to travel according to the traveling profile is smaller than that in the case of causing the vehicle to travel in the first traveling mode.

10. The travel assist device for a vehicle according to claim 8, further comprising a storage unit configured to store, when the vehicle travels in response to a driving operation by a driver, a driving operation relevant value which is a value regarding how the driving operation is, and the creation unit creates the traveling profile so that the maximum value of the acceleration of the vehicle at the time of causing the vehicle to travel according to the traveling profile has a value based on the driving operation relevant value stored in the storage unit.

11. The travel assist device for a vehicle according to claim 8, wherein, out of the traveling profile, the creation unit creates the acceleration section, in which the vehicle is accelerated, by using a seventh degree or smaller polynomial function.

12. The travel assist device for a vehicle according to claim 1, wherein the vehicle is capable of traveling in a plurality of traveling modes including a first traveling mode and a second traveling mode that places a higher priority on comfort of an occupant of the vehicle than in the case of traveling in the first traveling mode, and when the vehicle travels in the second traveling mode, the creation unit creates the traveling profile so that a maximum value of the acceleration of the vehicle at the time of causing the vehicle to travel according to the traveling profile is smaller than that in the case of causing the vehicle to travel in the first traveling mode.

13. The travel assist device for a vehicle according to claim 1, further comprising a storage unit configured to store, when the vehicle travels in response to a driving operation by a driver, a driving operation relevant value which is a value regarding how the driving operation is, and the creation unit creates the traveling profile so that the maximum value of the acceleration of the vehicle at the time of causing the vehicle to travel according to the traveling profile has a value based on the driving operation relevant value stored in the storage unit.

14. A travel assist device for a vehicle that assists in traveling of a vehicle from a start position to a target position, comprising:

a creation unit configured to create a traveling profile, which is an index of a change in a state amount on a vehicle velocity of the vehicle with respect to the lapse of time, based on a traveling distance of the vehicle from the start position to the target position; and an output unit configured to output an operation amount according to a target state amount, which is a target value of the state amount indicated by the traveling profile, to at least one of a driving device and a braking device of the vehicle, wherein in a state in which the vehicle travels by driving of the at least one of the devices based on the operation amount, the creation unit re-creates the traveling profile so that acceleration of the vehicle does not exceed a predetermined limit value if a difference between an actual value of the state amount and the target state amount is equal to or larger than a judgment difference, wherein the creation unit creates the traveling profile including an acceleration section in which the vehicle is accelerated and a constant velocity section in which the vehicle is caused to travel at a constant velocity, and re-creates the traveling profile, when the traveling profile is re-created in a state in which the vehicle travels by outputting the operation amount according to the acceleration section from the output unit to the at least one of the devices, so that the length of time in which the vehicle is caused to travel based on a target vehicle velocity during constant velocity traveling, which is the target vehicle velocity of the vehicle in the constant velocity section, is changed.

* * * * *